US006181095B1

United States Patent
Telmet

(10) Patent No.: US 6,181,095 B1
(45) Date of Patent: *Jan. 30, 2001

(54) GARAGE DOOR OPENER

(75) Inventor: Juhan Telmet, Sterling Heights, MI (US)

(73) Assignee: KDS Controls, Inc., Troy, MI (US)

( * ) Notice: Under 35 U.S.C. 154(b), the term of this patent shall be extended for 0 days.

This patent is subject to a terminal disclaimer.

(21) Appl. No.: 09/405,034

(22) Filed: Sep. 24, 1999

Related U.S. Application Data

(63) Continuation of application No. 09/107,612, filed on Jun. 30, 1998, now Pat. No. 6,020,703.
(60) Provisional application No. 60/051,319, filed on Jun. 30, 1997.

(51) Int. Cl.[7] ....................................... G05B 5/00
(52) U.S. Cl. .............................. 318/480; 318/266; 49/28
(58) Field of Search ................................ 318/266, 480, 318/468, 469; 49/25.28; 250/200, 206, 221, 222.1, 559.12; 340/556

(56) References Cited

U.S. PATENT DOCUMENTS

| | | | |
|---|---|---|---|
| 4,843,639 | * 6/1989 | Beals | 455/603 |
| 4,888,532 | * 12/1989 | Josson | 318/480 |
| 5,191,268 | * 3/1993 | Duhame | 318/266 |
| 5,233,185 | * 8/1993 | Whitaker | 250/222.1 |
| 5,285,136 | * 2/1994 | Duhame | 318/266 |
| 5,384,495 | * 1/1995 | Waggamon et al. | 307/326 |
| 5,428,923 | * 7/1995 | Waggamon | 49/28 |
| 5,461,227 | * 10/1995 | Blau | 250/221 |
| 5,465,033 | * 11/1995 | Fassih-Nia | 318/480 |
| 5,508,511 | * 4/1996 | Zur et al. | 250/222.1 |
| 5,656,900 | * 8/1997 | Michel et al. | 318/286 |
| 6,020,703 | * 2/2000 | Telmet | 318/480 |

* cited by examiner

Primary Examiner—Robert E. Nappi
Assistant Examiner—Rina I. Duda
(74) Attorney, Agent, or Firm—Reising, Ethington, Barnes, Kisselle, Learman & McCulloch, P.C.

(57) ABSTRACT

A power actuated door opener is disclosed with a beam break system for detecting obstructions in a door opening. A transmitter includes a beam emitter and emitter drive circuit for transmitting a train of emitter pulses to a receiver. The receiver includes a pulse detector circuit with a beam detector for producing detector pulses in response to emitter pulses impinging on the detector. The emitter drive circuit and the pulse detector circuit are synchronously coupled with each other and the pulse detector circuit produces a normal output signal only if the detector receives a pulse which is in synchronism with an emitter pulse. The receiver includes an annunciator which produces an audible and a visible warning signal when the pulse detector circuit produces a fault output signal. The audible annunciator is a piezoelectric crystal mounted in the receiver housing with a cover plate operating as a sounding board.

11 Claims, 10 Drawing Sheets

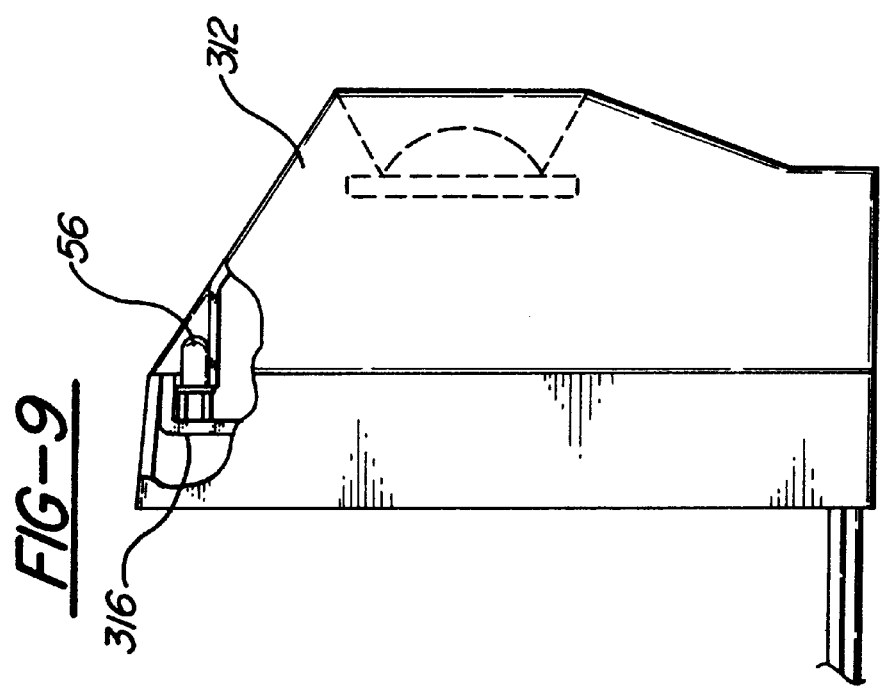
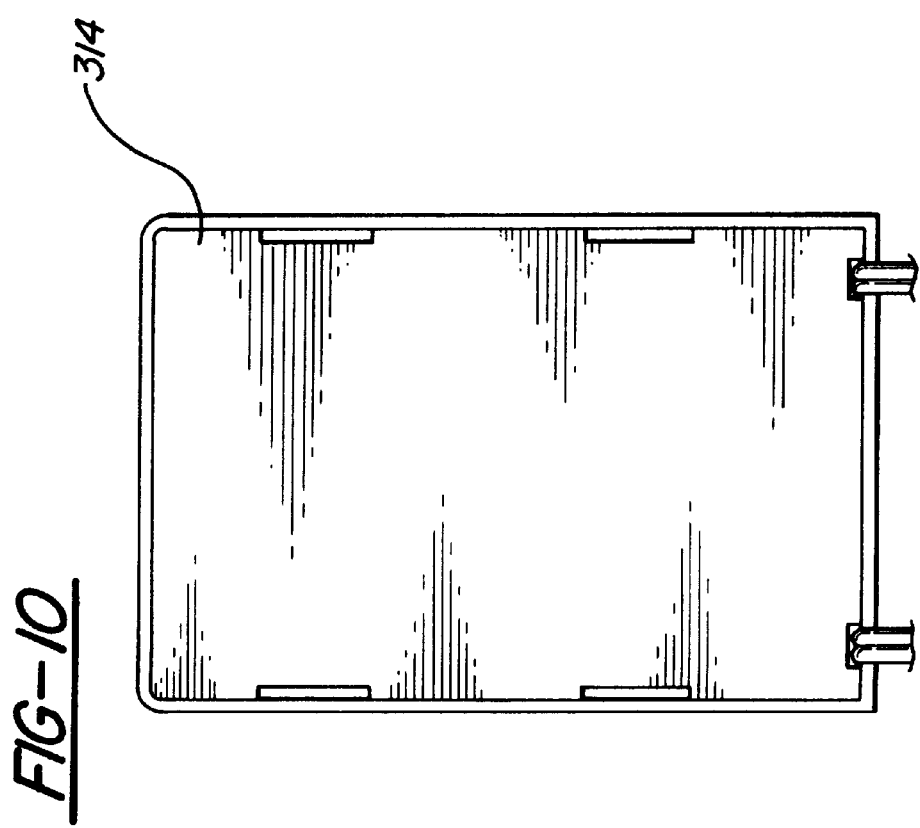

GARAGE DOOR OPENER

This application is a continuation of U.S. Ser. No. 09/107,612, filed Jun. 30, 1998, now U.S. Pat. No. 6,020,703, granted Feb. 1, 2000 which claims the benefit of U.S. Provisional Ser. No. 60/051,319 filed Jun. 30, 1997.

FIELD OF THE INVENTION

This invention relates to power actuated garage door openers and more particularly to garage door openers having obstruction detection devices.

BACKGROUND OF THE INVENTION

Obstacle detection systems for garage door openers are well known. One type of detector utilizes an infrared (IR) beam transmitted across the door opening and is sometimes to referred to as a "beam break" unit. In this obstruction detector system, an IR emitter and IR detector are disposed on opposite sides of the door opening and the emitter sends a beam of IR pulses to the receiver. If the beam is broken by an obstruction, the garage door opener (GDO) is signalled to inhibit initiation of door closure or, if the door is closing, to stop and reverse the movement of the door.

SUMMARY OF THE INVENTION

This invention resides in improvements in a beam break type of obstruction detection system of a garage door opener. In addition to the usual functions of known beam break systems, the invention provides an annunciator which produces an audible and/or visible indication of an obstruction or a malfunction such as a misalignment of the emitter and receiver. Additionally, the invention provides a more effective utilization of the sequence of beam pulses in detecting an obstruction.

Further, in accordance with this invention, a signalling device which produces an audible or visual signal is provided for indicating an interruption of the beam and to aid the user in identifying a faulty condition such as misalignment.

Further, in accordance with this invention, in normal operation of the obstruction detection system, the beam emitter is immediately turned off, upon receipt of a transmitted pulse by the detector, until the next pulse transmission sequence. This achieves effective operation with transmission of an extremely short pulse instead of a pulse, which in typical systems, may be 100 to 1,000 times longer. This results in a substantial reduction of power required for pulse transmission. This is especially useful in the system of this invention which uses a capacitor storage power supply system.

Further, in accordance with this invention, the transmitter and receiver are operated in synchronism in such a manner that the receiver is enabled for reception of a pulse only in coincidence with the transmission of a pulse. This permits two or more systems to be installed on different doors in the same garage without the problem of having a pulse transmitted from one system interfere with operation of another system.

Further, in accordance with this invention, a visual signal perceptible to the user is given in the case of an occasional missing pulse or in case of several missing pulses in sequence. In this, a single missing pulse will be effective to prevent the door from closing. Additionally, the pulsing of the light emitting diode (LED) of the visual indicator is changed so that it is perceptibly flashed instead of giving the appearance of steady state illumination. Also, an audible signal is produced. The visual and audible signals are especially advantageous for use in adjusting the alignment of the emitter and detector during installation or servicing.

As used herein, the term "annunicator" means a device which, in response to one or more predetermined conditions, produces a perceptible signal. The term "perceptible signal" means a signal which can be perceived by the visual, auditory or other senses of a person.

A complete understanding of this invention will be obtained from the detailed description that follows.

DESCRIPTION OF THE DRAWINGS

FIG. 9 shows the housing of the receiver;

FIG. 10 shows the sounder of the annunicator system; and

BEST MODE FOR CARRYING OUT THE INVENTION

Figure 1:
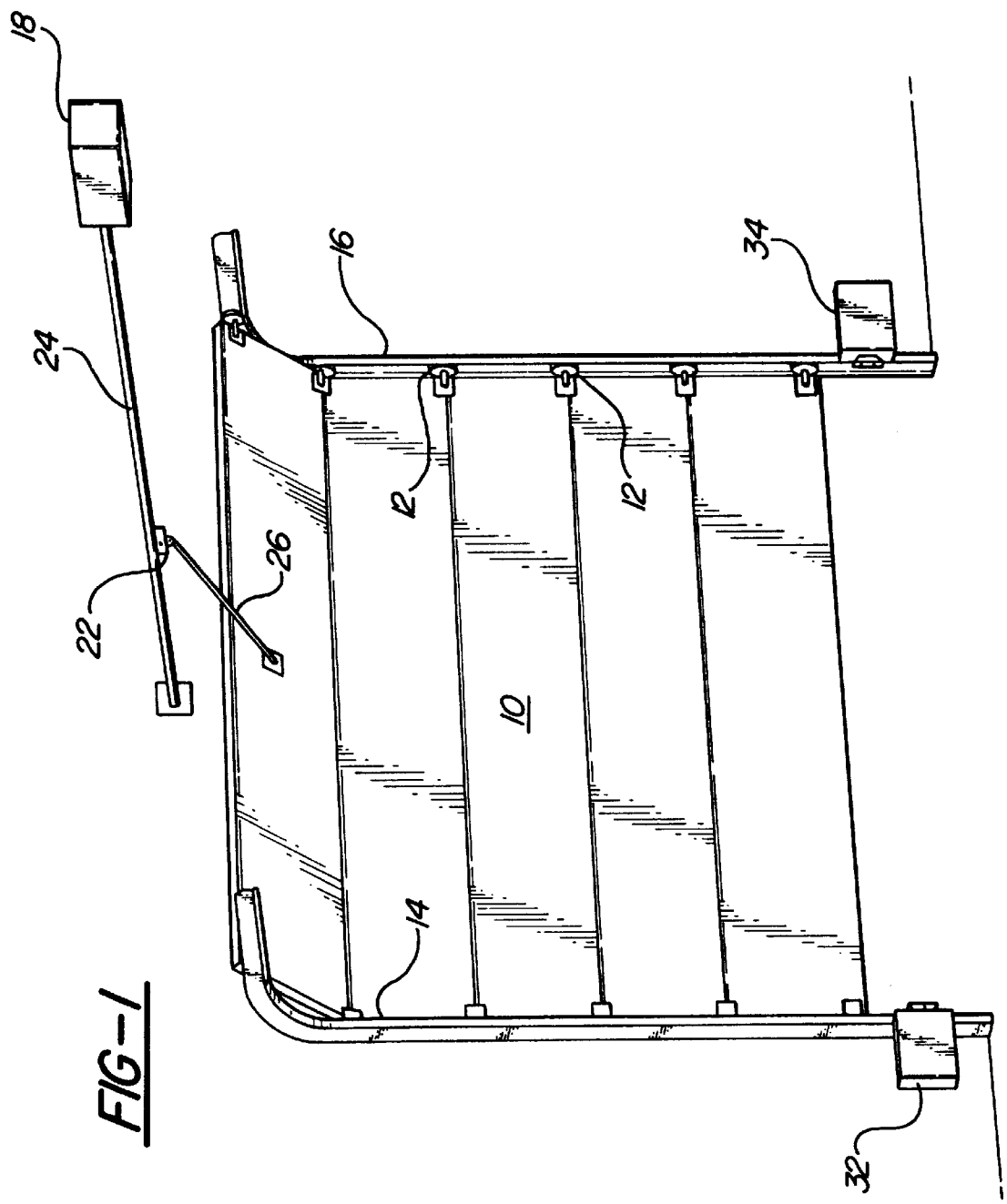
FIG. 1 is a pictorial view of a garage door equipped with an obstruction detection system of this invention.

FIG. 1 shows a typical installation of a garage door opener incorporating an obstacle detection system in accordance with this invention. The garage door 10 is of the overhead folding type and supported for movement between open and closed positions by a set of rollers 12 which are movable in stationary tracks 14 and 16 at opposite sides of the door. An electric power actuator 18, which includes an electric drive motor, is mounted above the door and connected thereto in a well known manner by a chain or screw driven carrier 22 which is movable in a fixed track 24 and which is connected through an arm 26 with the door. The door is movable between the open and closed positions by selectively energizing the drive motor by means of a manually actuated local switch or remote control device to cause the carrier 22 to be reversibly actuated.

The obstruction detection system includes an IR transmitter unit 32 at one side of the garage door opening and an IR receiver unit 34 at the other side. (Alternatively, the transmitter and receiver can be on the same side with a reflector on the opposite side.) The obstacle detection system and the annunciator of this invention will be described with reference to FIG. 2.

Figure 2:
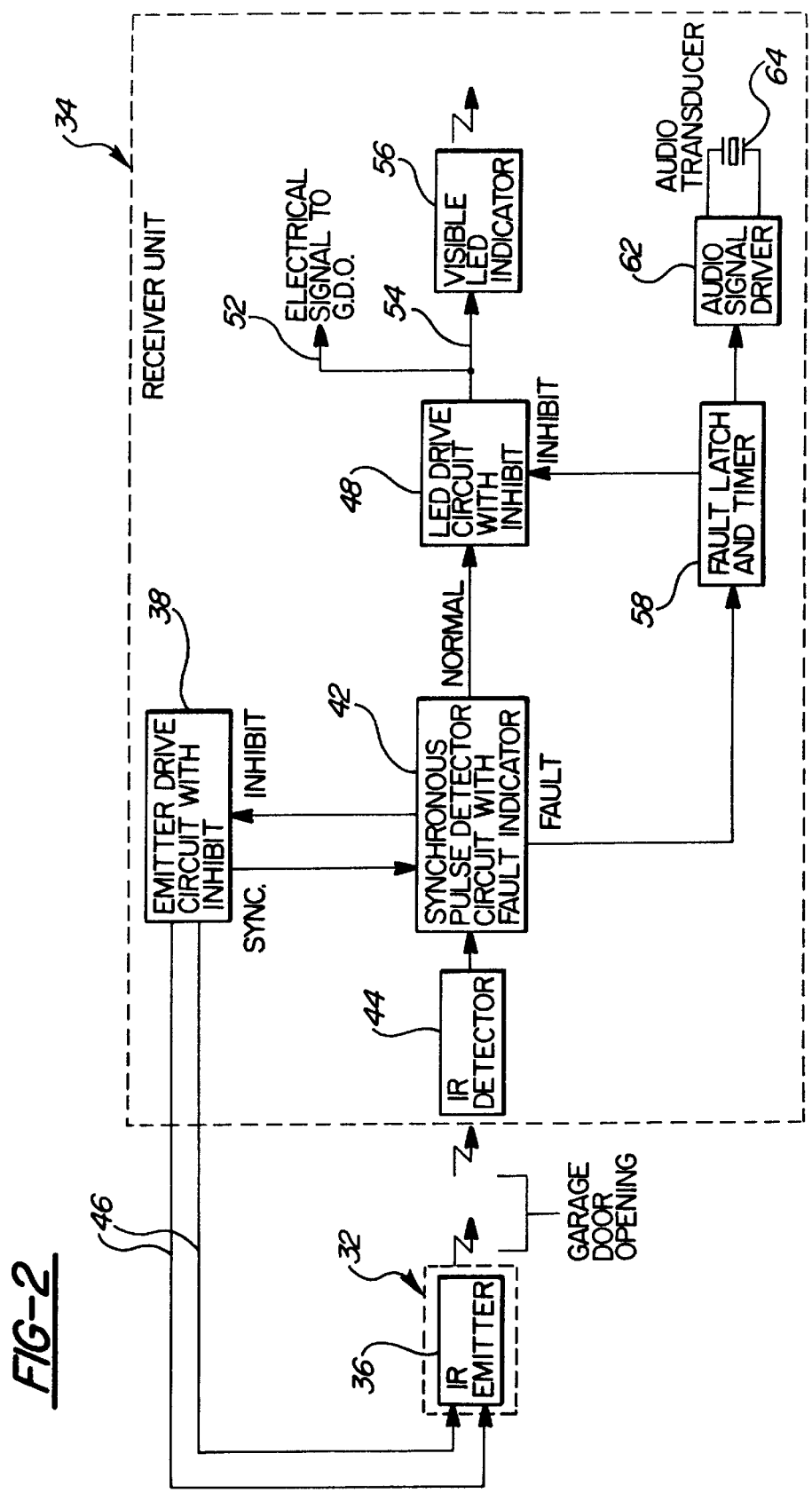
FIG. 2 is a block diagram of the obstruction detection system.

FIG. 2 is a block diagram of the electronic obstruction detection system and annunciator.

As shown in FIG. 2, the IR receiver unit 34 houses the electronic circuitry of the system and the transmitter unit 32 houses an IR emitter 36. The electronic circuitry in the receiver unit 34 comprises an emitter drive circuit 38 which works synchronously with a pulse detector circuit 42. An IR detector 44 is coupled to the input of the pulse detector 42 and responds to the IR beam transmitted from the emitter 36. The emitter drive circuit 38 generates drive signals which are transmitted to the IR emitter through conductors 46. The synchronous pulse detector includes a fault indicator. When there is no fault, the "normal" signal is generated and applied to a light emitting diode (LED) drive circuit 48. The LED drive circuit develops an output signal which is coupled through conductor 52 to the garage door opener unit 18. This output signal is also applied through circuit 54 to the visible LED indicator 56 which is turned on to indicate that there is no obstruction. The pulse detector circuit 42 is operative to generate a "fault" signal in the event of certain malfunctions. This signal is applied to a fault latch and timer circuit 58 which applies an "inhibit" signal to the LED drive circuit 48. It also applies an annunciator signal to an audio signal driver 62 which energizes an audio transducer 64 such as a piezoelectric crystal to generate an audible indication of a fault.

In operation, the emitter drive circuit 38 and the pulse detector circuit 42 operate in synchronism. When an emitter pulse is generated by the drive circuit 38 a synchronizing pulse is applied to the pulse detector circuit 42. This sets the pulse detector for reception of a pulse from the IR detector 44. The drive pulse from the emitter drive circuit 38 is also applied to the IR emitter 36 which emits a pulse into the garage door opening. If that pulse is received by the IR detector within a predetermined time period, the pulse detector 42 generates a normal output signal to the LED drive circuit 48. In turn, the LED drive circuit applies a signal to the garage door opener which enables energization of the drive motor for closing of the door. The output of the LED drive circuit also energizes the visible LED indicator 56 which gives a visible indication that there is no obstruction. In addition, when the emitted pulse from the IR emitter 36 is detected by the pulse detector 42, the pulse detector generates an inhibit signal which is applied to the emitter drive circuit 38. This terminates the remainder of the emitter pulses until the next pulse sequence is initiated. This minimizes the pulse width from the drive circuit and thereby reduces the dissipated power and long term degradation of the IR emitting device 36. In the case of a storage capacitor type of power supply, it also conserves available energy for the next pulse sequence.

If the pulse stream received by the pulse detector 42 from the IR detector 44 does not correspond properly with the stream generated by the emitter drive circuit, a malfunction is indicated as follows. When there is a single pulse missing from the pulse stream the pulse detector 42 generates a fault signal. This may occur, for example, if there is a small physical misalignment of the IR emitter 36 and the IR detector 44 such that a pulse emitted from the emitter 36 during a low voltage condition is not detected by the pulse detector 42. The fault signal sets the fault latch and timer 58 which applies a signal to the audio signal driver 62 for a predetermined time period of about 0.4 seconds and starts a six second timer. This energizes the audio transducer 64 which generates an audible tone easily heard by a person in the vicinity. At the same time, the fault latch and timer 58 applies an inhibit signal to the LED drive circuit 48 which turns off the visible LED indicator for a predetermined time period of about 0.4 seconds as a visual indication of the fault. Also, at the same time, the electrical signal to the garage door opener disenables operation of the drive motor for the duration of the fault.

When there is a persistent obstruction in the IR beam between the emitter 36 and detector 44, the system operates in the manner similar to that described above. The pulse detector circuit 42 generates a fault signal which sets the fault latch and timer 58 which enables the audio signal driver to energize the transducer 64. As long as the beam is obstructed, the fault latch and timer will allow the tone to be repeated every six seconds. Since no normal signal will be generated by the pulse detector circuit 42, it causes the LED drive circuit 48 to turn off the visible LED indicator 56 and to disenable operation of the drive motor of the garage door opener.

If multiple pulses are detected by the IR detector 44 in addition to the pulses from the IR emitter 36 which are initiated by the emitter drive 38, the pulse detector 42 ignores such multiple pulses because of their lack of synchronism with the emitter drive circuit. Such multiple pulses may occur, for example, due to a second IR emitter of a transmitter unit in another garage door obstruction detection system in the same garage. Such extraneous multiple pulses may also be due to electrical noise from radio frequency interference of nearby electrical devices. Under this circumstance of multiple extraneous pulses, the system functions normally in response to the synchronous pulses which are initiated by the emitter drive circuit 38 and detected by the pulse detector 42. Under no conditions will the interruption of the normal return pulses not be detected.

The control circuit and its operation will be described in greater detail below.

Control Circuit Using Discrete Logic Components

Figure 3:
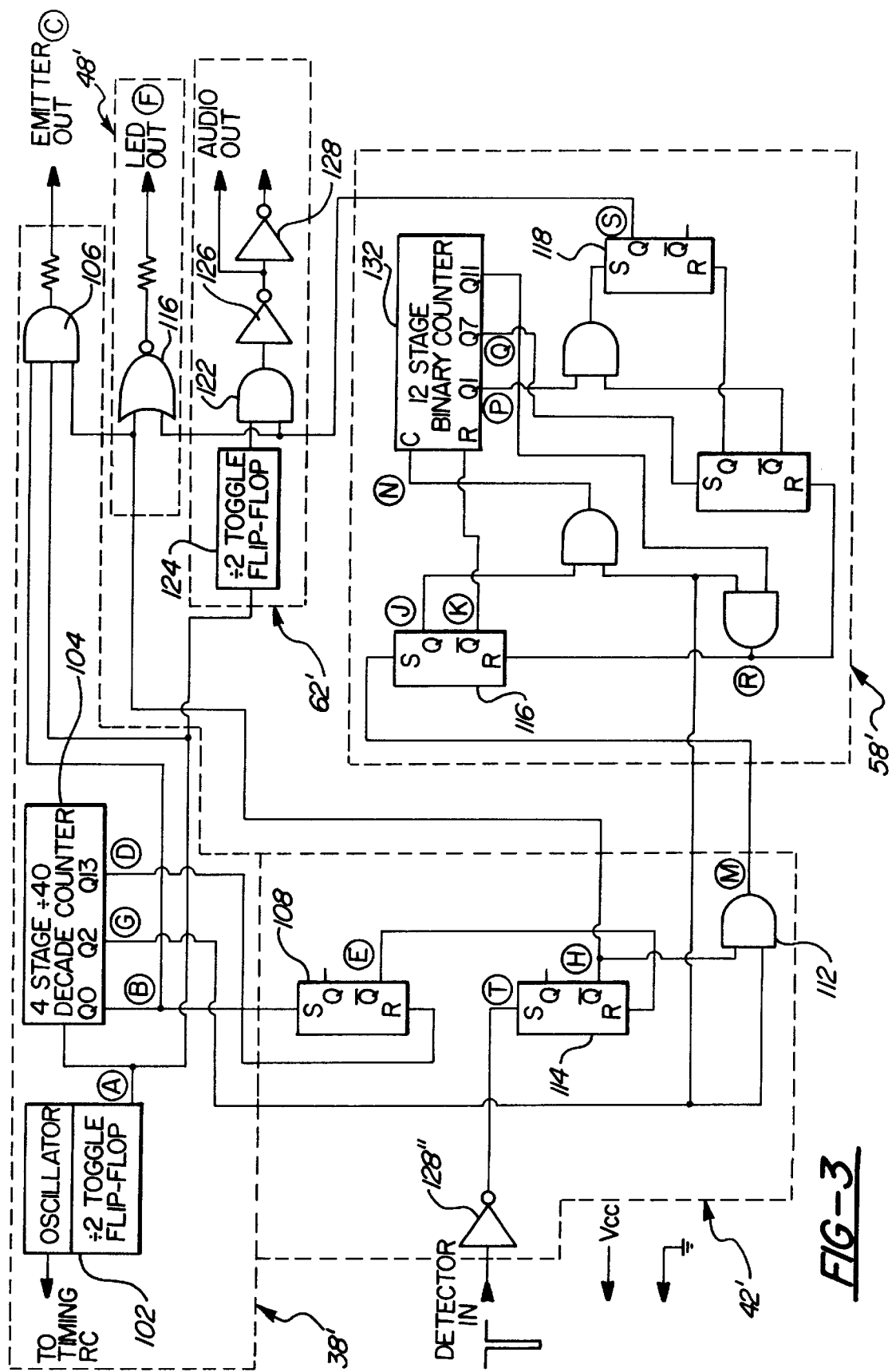
FIG. 3 shows the receiver of FIG. 1 implemented with use of discrete logic components.

FIG. 3 shows the control circuit of the receiver 34 implemented by means of discrete logic components. In FIG. 3, the various sections of the control circuit are enclosed within dashed line blocks. The blocks in FIG. 3 which correspond to the blocks in FIG. 2 are designated by the same reference characters with the addition of a prime symbol. Accordingly, the emitter drive circuit with inhibit 38' in FIG. 3 corresponds with block 38 of FIG. 2. Similarly, the synchronous pulse detector circuit with fault indicator 42' of FIG. 3 corresponds with block 42 of FIG. 2. Also, the fault latch and timer 58' of FIG. 3 corresponds with block 58, the LED drive circuit with inhibit 48' of FIG. 3 corresponds with block 48 and the audio signal driver 62' of FIG. 3 corresponds with block 62.

Figure 4:
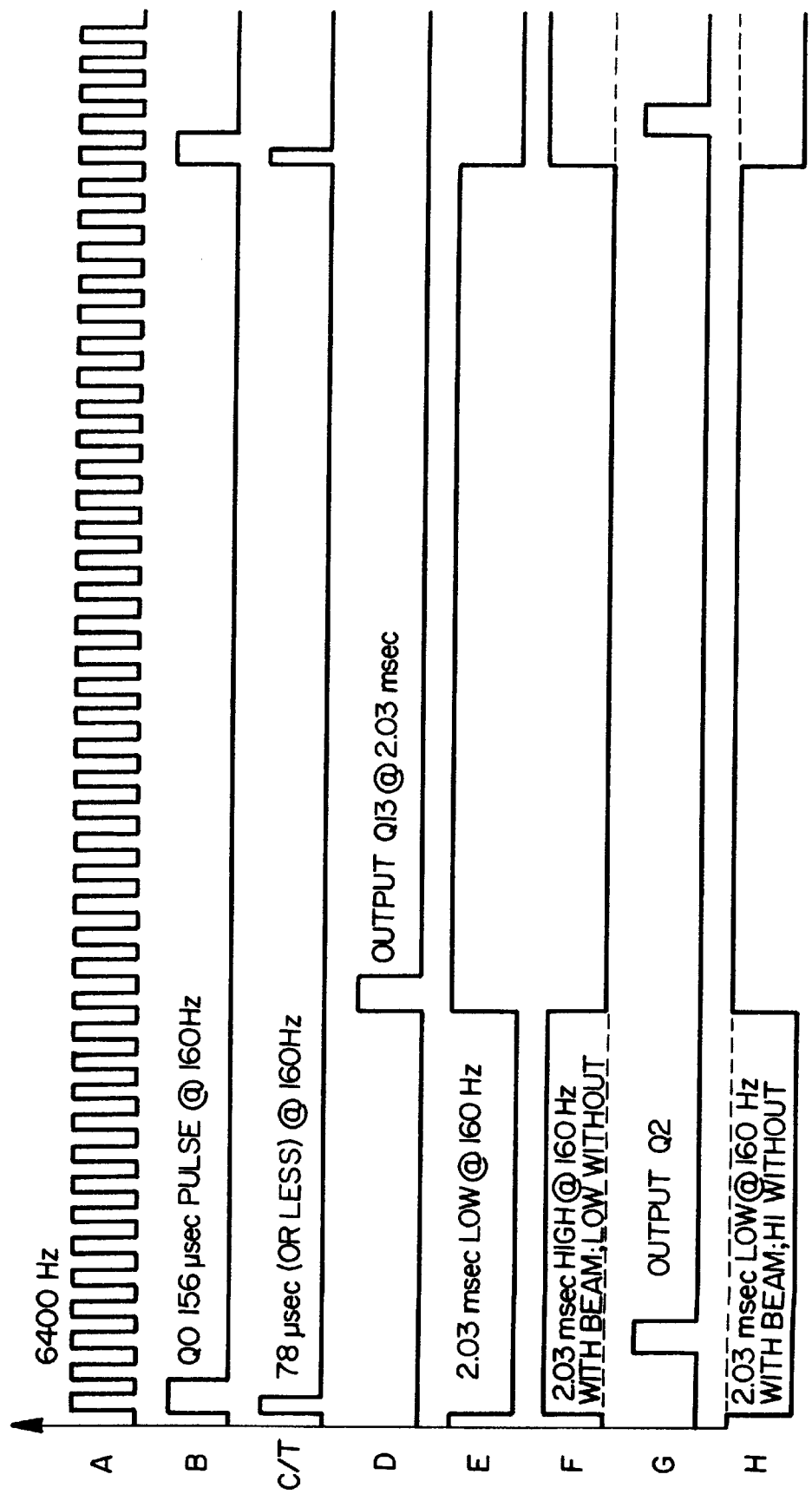
FIGS. 4, 5 AND 6 are timing diagrams of the control system.
Figure 5:
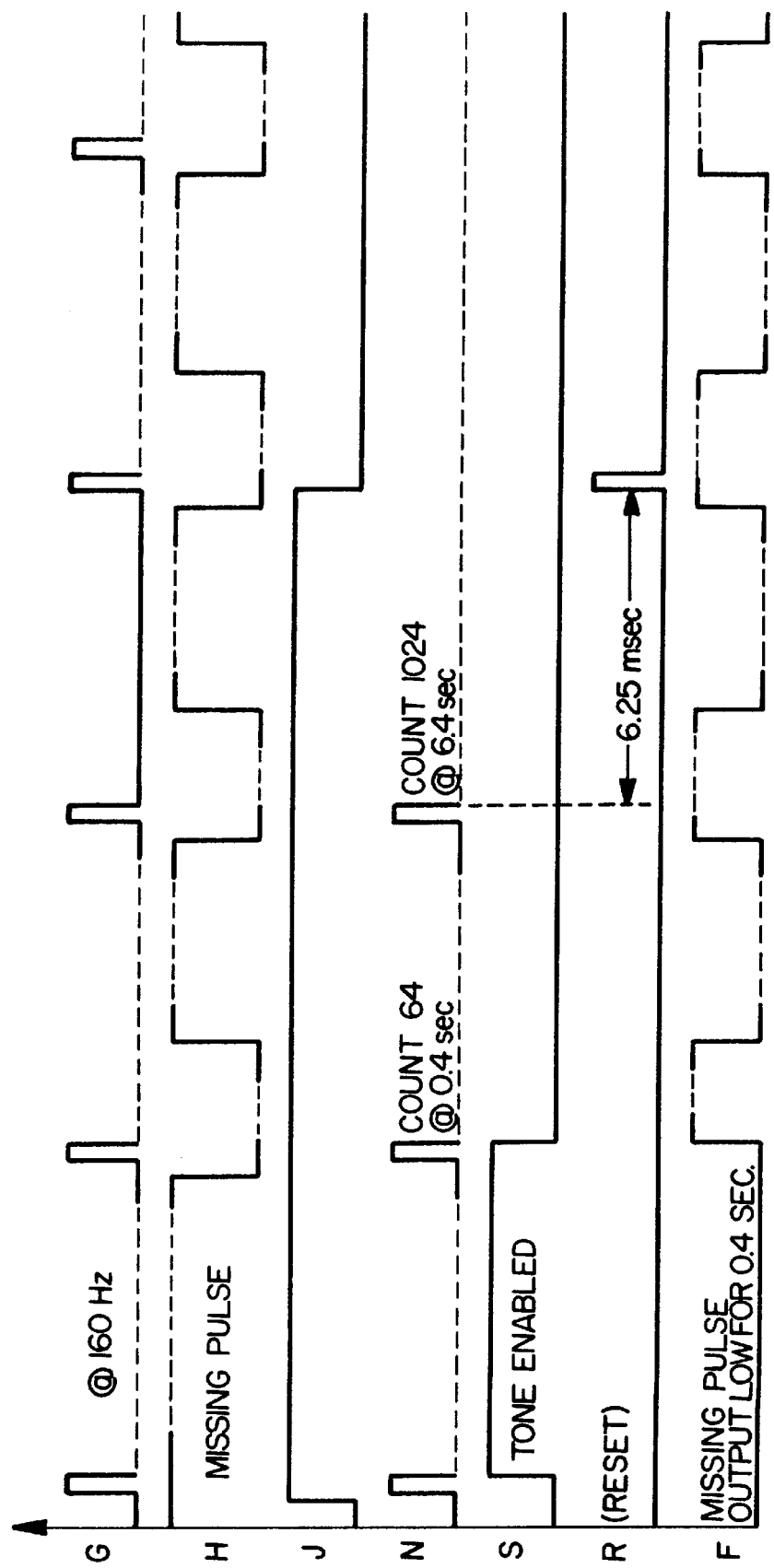
Figure 6:
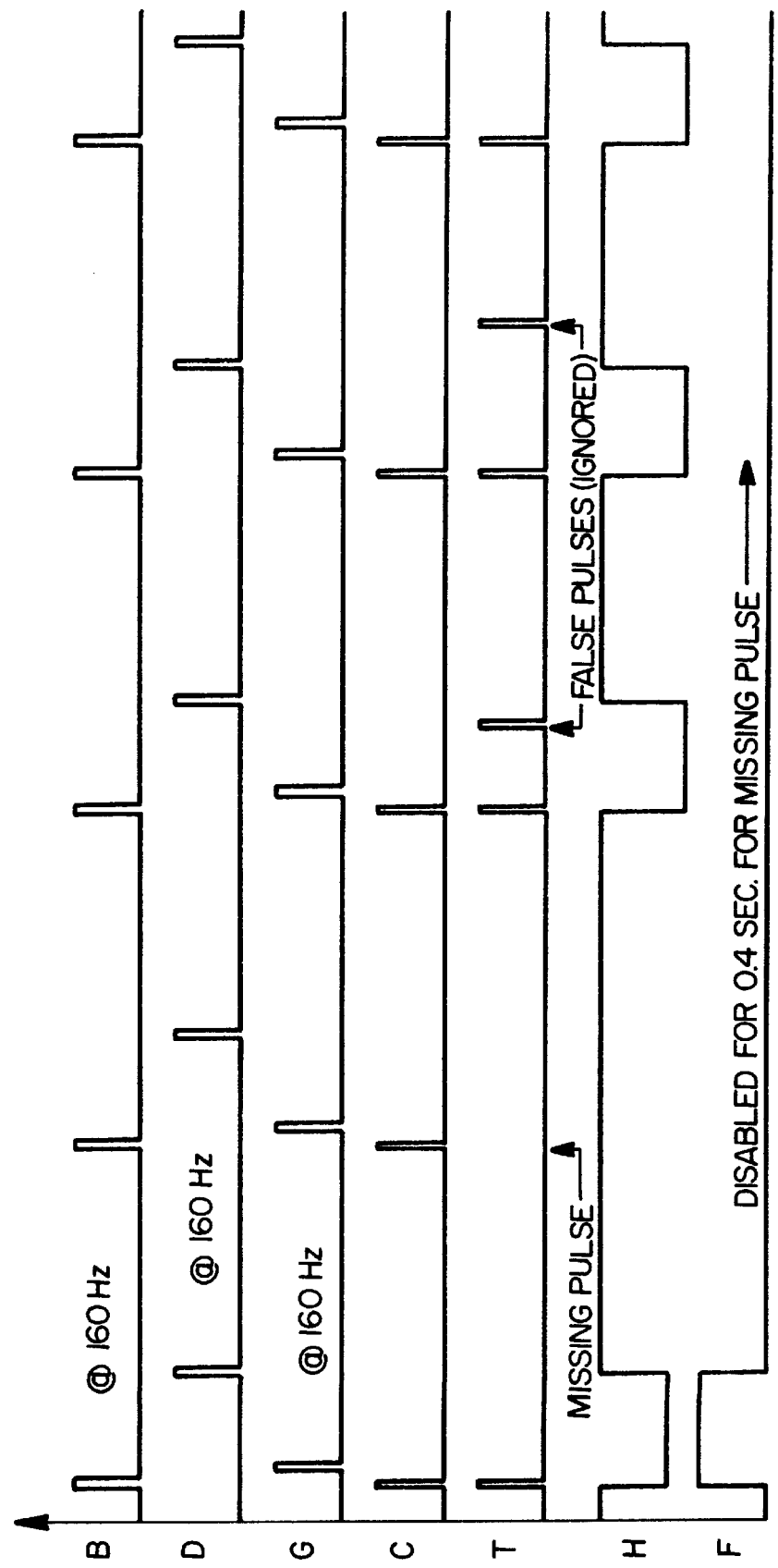

In the circuit diagram of FIG. 3, certain points or nodes are identified with encircled alphabetic characters such as A, B, C, etc. which also identify, in the timing diagram of FIGS. 4, 5 and 6, the waveforms at the same points. Thus, the waveform at node A in FIG. 3 is shown as waveform A in the timing diagram of FIG. 4.

In the control circuit of FIG. 3, an oscillator 102 generates a waveform A which is applied to the input of a divide-by-forty decade counter 104 and to the inputs of certain other components. The decade counter 104 has outputs Q0, Q2 and Q13 which produce output waveforms B, G and D as shown in the timing diagrams. The output Q0 of the counter is applied to an input of AND gate 106 the output of which is applied to the emitter 36 through a transistor, not shown in FIG. 3. The output of the emitter 34 is depicted as waveform C in the timing diagram. The output Q2 of the counter 104 is applied to one input of an AND gate 112 which has its other input connected with the Q-not output of a flip-flop 114. (All of the flip-flops in the control circuit operate so that when the reset input is at logic high the Q-not output is high regardless of the state of the set input. The output of the AND gate 112 is applied to a set input of a flip-flop 116 in the fault latch and timer 58'. The logic of the fault latch and timer 58' is illustrated in the timing diagrams of FIGS. 4, 5 and 6 and will not be described in further detail. The Q13 output of the counter 104 is applied to the reset input of the flip-flop 108 which has its set input connected with the Q0 output of the counter. The Q-not output of the flip-flop 114 is applied to one input of the AND gate 106 as an emitter inhibit signal and is applied to an input of the NOR gate 116 of the LED drive circuit 48' as a drive signal. The output stage of the fault latch and timer 58' is a flip-flop 118 which has its Q output connected to one input of the NOR gate 116 which disables the visual LED signal for about 0.4 seconds to produce blinking that can be perceived by the human eye. The output of the NOR gate 116 is coupled with a transistor, not shown in FIG. 3, which drives the visible LED indicator 56. This will be described with reference to FIG. 7 subsequently. The Q output of the flip-flop 118 is also applied to one input of an AND gate 122 in the audio signal driver 62'. The other input of the AND gate 122 receives the output of a divide-by-two toggle flip-flop 124 which receives its input from the oscillator 102. The output of the AND gate 122 in the audio signal driver 62' is applied through cascaded inverters 126 and 128, the outputs of which are applied to the sounder which, for example, is a speaker piezoelectric crystal. The outputs of the inverters 126 and 128 are in the audible frequency range suitably a 3200 hertz square wave with fifty percent duty cycle.)

The operation of the control circuit will now be described in its normal operating condition, i.e. when the beam is properly aligned between the emitter 36 and the detector 44 and is operating without any obstruction. This description will refer to the circuit of FIG. 3 and the timing diagrams of FIGS. 4, 5 and 6. The Q0 output of the decade counter 104 goes high for approximately 156 microseconds as indicated in waveform B. This enables the AND gate 106 of the emitter drive circuit. The Q0 output also sets flip-flop 108 which causes the Q-not output, waveform E, to enable the flip-flop 114 to receive the detector signal from the detector 44 through an inverter 128. This input to the flip-flop 114 is the return pulse, waveform T, in the timing diagram. When a return pulse is received, the waveform T goes high and sets the flip-flop 114 causing Q-not to go low with the waveform H. This logic low at AND gate 106 immediately inhibits the emitter drive and also enables the visible LED drive 48'. Approximately two milliseconds later the Q13 output of the decade counter 104 goes high as indicated in waveform D. This resets flip-flop 108 which causes the Q-not output to go high as shown by waveform E. This resets the flip-flop 114 causing Q-not output to go high as indicated by waveform H.

When the Q-not output of flip-flop 114 goes high the visible LED drive 48' is turned off and the inhibit signal is removed from the emitter drive at AND gate 106. The decade counter 104 continues to count for approximately four milliseconds and then the sequence described above is repeated. Thus, in normal operation, the visible LED indicator 56 is pulsed continuously with pulses of approximately two millisecond duration at 160 hertz so that it appears as a steady light to the human eye. On the other hand, the emitter is turned off immediately after the first pulse is received and it remains off until the first pulse in the next sequence is received, at which time it is turned on and then off in the same manner. This conserves energy in the power supply for the infrared (IR) emitter and also lessens the degradation of the emitter over time. The power supply for the IR emitter and the visible LED will be described subsequently with reference to the circuit of FIG. 7.

The operation of the control circuit in the missing pulse mode will now be described with reference to FIG. 3 and the timing diagrams of FIGS. 4, 5 and 6.

According to this invention, an improved missing pulse mode of operation is provided which not only stops or reverses the closing of the door in the case of an obstruction but also serves as an aid in proper alignment of the transmitter and receiver. In certain operating conditions, the beam detector 44 may fail to receive one or more pulses which are emitted by the emitter 36. This may arise in the case of a momentary or long term obstruction of the beam. Also, it may result from marginal misalignment of the emitter 36 and the detector 44, especially if there is a misalignment which results in only a weak pulse at the detector. This is aggravated in case of a coincidence of a low voltage condition in the transmitter/receiver system due, for example, to a fluctuation in voltage received from the public utility power lines.

The missing pulse detecting circuitry and mode of operation will now be described with reference to the circuit of FIG. 3 and the timing diagrams of FIGS. 4, 5 and 6.

When Q0 of the decade counter 104 goes high as indicated in the waveform B, the emitter drive circuit with inhibit 38 is enabled. This also sets the flip-flop 108 causing the Q-not output to go low as shown in the waveform E. This Q-not output is connected to the reset input of the flip-flop 114 which enables it to receive the signal from the detector 44, i.e. the return pulse shown by waveform T. If a return pulse is received by the detector, the operation is normal as described above. If however the return pulse is not received, i.e. missing pulse condition, Q2 of the decade counter 104, approximately 300 microseconds later, goes high as shown by waveform G. Flip-flop 114, due to the missing pulse as indicated in waveform T, does not put the flip-flop 114 in the set condition and the Q-not remains at logic high, as shown by waveform H. Accordingly, the AND gate 112 receives a logic high on both inputs and it applies a logic high, at M, to the set input of the flip-flop 116 in the fault latch and timer 58'. This causes the output flip-flop 118 to be set which produces a logic high for approximately 0.4 seconds on the Q output as shown by the waveform S. The logic high at the Q output of flip-flop 118 is applied to the inhibit input of the NOR gate 116 in the LED drive circuit with inhibit 48'. This logic high also is applied to the enable input of AND gate 122 in the audio signal driver 62' and enables the driver for 0.4 seconds. Thus, the visible LED 56 is turned off for about 0.4 seconds which is long enough so that the human eye perceives on and off flashing of the LED. The switching of the audio signal driver 62 by the AND gate 122 produces a tone which is readily perceived by the human ear. After about 0.4 seconds, the Q output of the flip-flop 118 goes back to logic low as shown by waveform S and is inhibited from going high again for approximately six seconds. This minimizes the annoyance of the user by the audible signal. Output Q11 of the binary counter 132 along with the next logic high at output Q2 of decade counter 104 (waveform G) resets the fault latch and timer 58'.

In case the beam is block continuously, the input signal on the set input of flip-flop 114 will not go high and thus the flip-flop will not be set and the Q-not output (waveform H) will not go low. As a result visible LED 56 will be off continuously and fault latch and timer 58' will cycle giving a high at the Q output of flip-flop 118 (waveform S) for 0.4 seconds at intervals of 6.4 seconds.

Control Circuit Implemented With Application Specific Integrated Circuit

Figure 7:
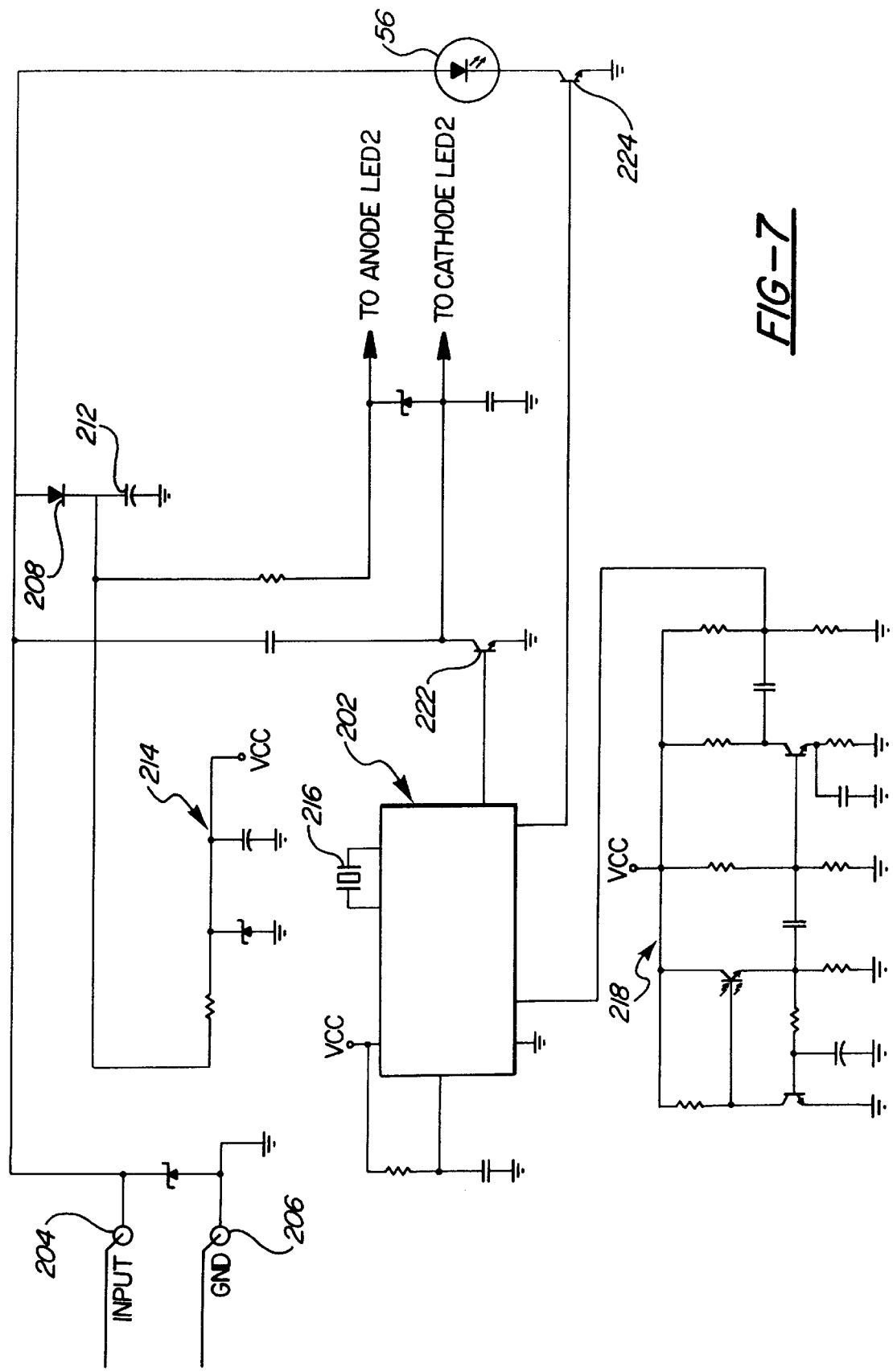
FIG. 7 is a preferred embodiment of the control system using an asic.

FIG. 7 depicts the obstruction detection system with a control circuit implemented in the form of an application specific integrated circuit (asic) 202. Asic 202 comprises circuitry which is functionally equivalent to the circuit described with reference to FIG. 3. The control circuit depicted in FIG. 7 receives power across the input terminal 204 and ground terminal 206 on a two-wire line from the power actuator unit of the garage door opener (GDO). The nominal supply voltage across the input and ground terminals is 20 volts DC. The circuitry of the control circuit to be described is operative to produce a signal on the two-wire line to the GDO, as will be described presently. The input terminal is connected through a blocking diode 208 to a storage capacitor 212. A power supply circuit 214 for the asic 202 is connected in parallel with the storage capacitor 212 and provides a supply voltage VCC. This voltage is applied to pin 6 of the asic 202 and across the series resistor and capacitor which are connected to the pin 7 of the asic as part of the oscillator circuit. A piezoelectric crystal 216 is connected across pins 3 and 4 of the asic. A signal conditioning and ambient light compensating circuit 218 receives the input supply voltage VCC and produces an output signal which is connected with pin 8 of the asic 202. In a conventional manner, the circuit 218 comprises a phototransistor responsive to ambient infrared radiation and the circuit functions in a manner of an automatic gain control using the ambient infrared as a reference level.

The control circuit also includes a transistor 222 for switching the IR emitter 36 on and off and it includes a transistor 224 for switching the visible LED 56 on and off. The base of transistor 222 is connected with pin 2 of the asic and receives a pulse train from the Q0 output of the decade counter 104 corresponding with waveform C. When the transistor 222 is on, the IR emitter 36 draws current from the storage capacitor 212 and emits a pulse which is received by the IR detector 44. The asic 202 produces an output on pin 1 responsive to the received pulse which turns on transistor 224 to fire LED 56. The IR emitter 36 fires for a very brief interval and the visible LED fires substantially at the same time but for a longer interval. The LED 56 draws current from the input line and places the negative pulse on the line for the duration of conduction by the LED 56. When transistor 224 turns off, the storage capacitor 212 is recharged from the input line through the blocking diode 208. The negative pulse on the input line constitutes a control signal for the GDO. If the input pulse on the line is within certain limits of frequency, duration and amplitude the GDO functions in its normal mode. If the input pulse is not within such limits the GDO functions to prevent closing of the door or to reverse its direction if it is already closing.

Control Circuit Using A Microprocessor

Figure 8:
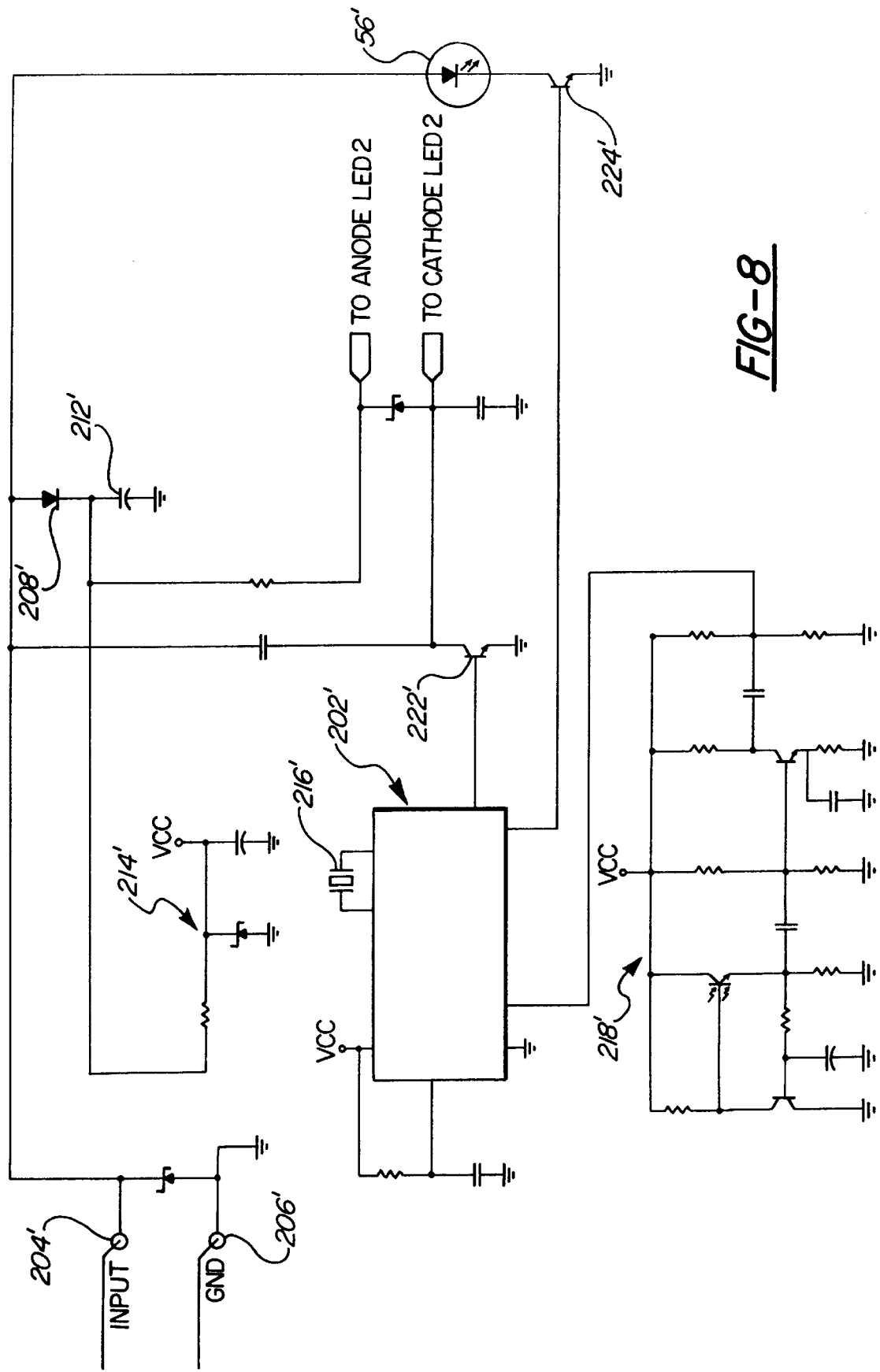
FIG. 8 is a preferred embodiment of the control system using a microprocessor.

FIG. 8 depicts a control circuit using a microprocessor 202' in place of the discrete logic component circuit of FIG. 3. The microprocessor 202' is functionally equivalent to the circuit of FIG. 3. The control circuit of FIG. 8 is the same as that described with reference to FIG. 7 except for the difference in pin connections to the microprocessor. The microprocessor is a Motorola 68HRC05KJ1. The peripheral circuits in FIG. 8 which correspond with the circuits in FIG. 7 have the same reference characters except that a prime symbol is added. Another difference is that the resistor and capacitor connected to pin 1 of the microprocessor constitute a reset circuit instead of the oscillator circuit.

The Sounder

Figure 11:
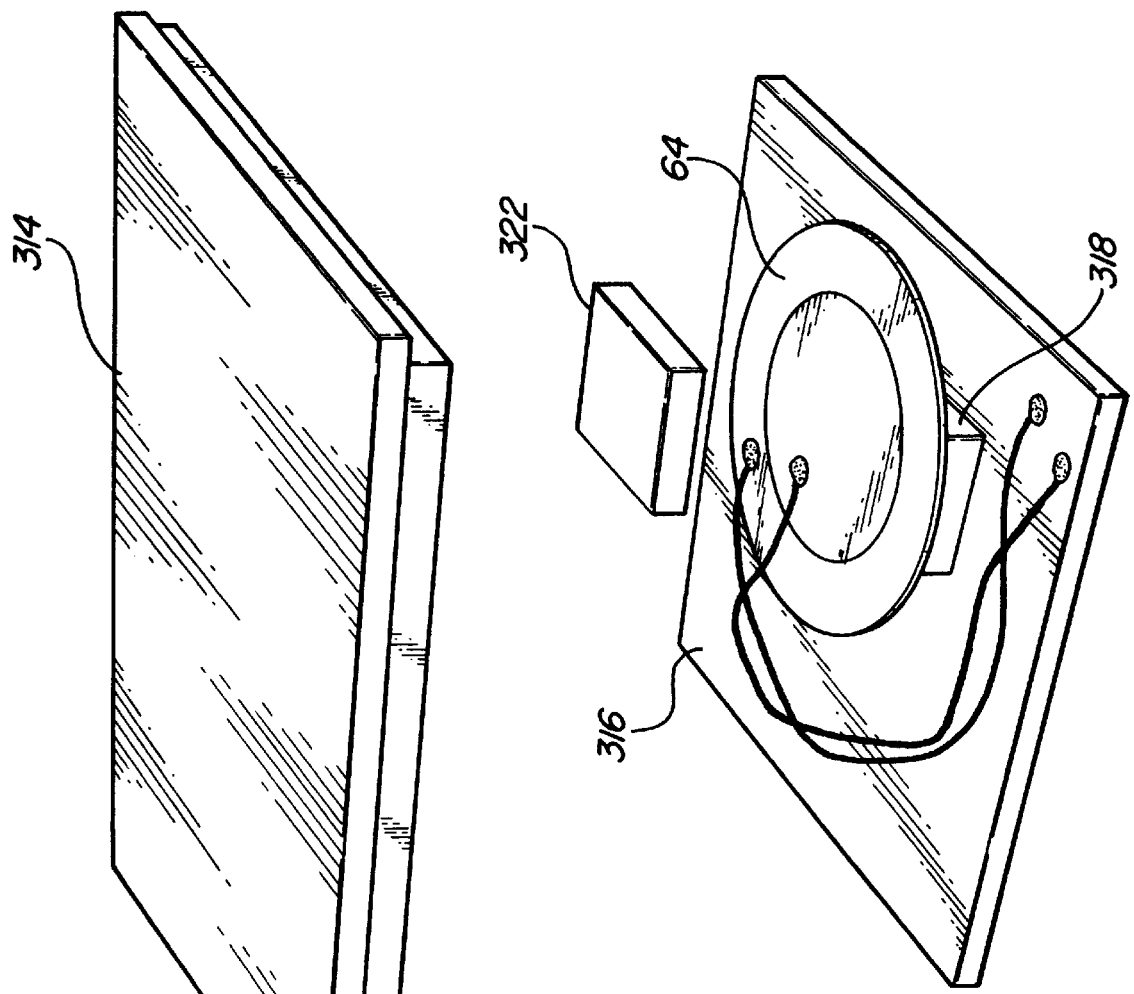
FIG. 11 shows details of the sounder.

A preferred sounder for the audio transducer 64 is shown in FIGS. 9, 10 and 11. In this embodiment, the piezoelectric crystal of the transducer is mounted in the housing of the receiver 34. In particular, as shown in FIGS. 9 and 10, the housing comprises a molded case 312 with a cover plate 314 which closes the case 312. The case 312 encloses the printed circuit board 316 of the control circuit as indicated in FIG. 9. As shown in FIG. 11, the piezoelectric crystal 64 is mounted on the printed circuit board by a foam pad 318 which is provided with an adhesive on both sides. The crystal is provided with an acoustical coupler in the form of a foam pad 322 which has an adhesive on one side which is secured to the face of the crystal. The foam pads 318 and 322 have a thickness such that installing the cover plate 314 compresses the pad 322 against the crystal such that the acoustic coupling is maximized between the crystal and the plate. The cover plate 314 and the casing 312 are constructed of molded plastic and the cover plate is secured by a snap fit around its periphery upon installation to the casing. The cover functions as a sounding board and amplifies the audible signal so that the sound can be easily heard for a distance of many feet.

Although the description of this invention has been given with reference to a particular embodiment, it is not to be construed in a limiting sense. Many variations and modifications of the invention will now occur to those skilled in the art. For a definition of the invention, reference is made to the appended claims.

What is claimed is:

1. In a door operator of the type comprising a power actuator for opening and closing a door, a control circuit for controlling energization and deenergization of the power actuator, a beam break system having a beam transmitter including a beam emitter for transmitting a pulsed beam of radiant energy across the doorway of said door and a beam receiver including a beam detector for receiving said pulsed beam, said control circuit including a pulse detector circuit for controlling energization of said power actuator in response to an obstruction of said beam or misalignment of said transmitter and receiver, the improvement wherein said control circuit comprises:

an emitter drive circuit for generating emitter drive pulses and having an output coupled with said beam emitter for energizing said emitter to emit said pulsed beam as a train of transmitter pulses, said pulse detector circuit having an input coupled with said beam detector, a synchronizing coupling between said emitter drive circuit and the pulse detector circuit and means in said pulse detector circuit for producing a normal control signal when a transmitter pulse is received by said beam detector in synchronism with an emitter drive pulse and for producing a fault control signal in the absence of receipt of a transmitter pulse by said beam detector in synchronism with an emitter drive pulse, and means responsive to said normal control signal for enabling energization of said power actuator and responsive to said fault control signal for disenabling energization of said power actuator.

2. The invention as defined in claim 1 including:

enabling means in said emitter drive circuit for producing enabling pulses for periodically enabling generation of an emitter drive pulse, a first pulse generating means responsive to each occurrence of a beam detector output pulse in synchronism with an emitter drive pulse for generating said normal control signal, said normal control signal being a first train of signal pulses having a first predetermined pulse rate and duration, and means for applying said normal control signal to said emitter drive circuit for inhibiting said emitter drive pulse upon occurrence of a signal pulse until the next enabling pulse.

3. The invention as defined in claim 1 including:

an annunciator circuit coupled with said pulse detector circuit and responsive to said fault control signal for producing a perceptible warning signal, said annunciator circuit comprises an LED and an LED drive circuit for energizing said LED, and means for applying said normal control signal to said LED drive circuit for repeatedly deenergizing said LED, said first train of signal pulses having a pulse rate and duration such that said LED produces light which appears steady to the human eye.

4. The invention as defined in claim 2 including:

a second pulse generating means responsive to the absence of a beam detector output pulse in synchronism with an emitter drive pulse for generating said fault control signal as a second train of signal pulses having a second predetermined pulse rate and duration, means responsive to said fault control signal for inhibiting said first pulse generating means from generating said normal control signal, and means coupled with said LED drive circuit and responsive to said fault control signal for repeatedly deenergizing said LED, said second train of signal pulses having a pulse rate and duration such that said LED produces light which appears intermittent to the human eye.

5. The invention as defined in claim 4 wherein:

said annunciator circuit includes an audible signal generator, and means coupled with said audible signal generator and responsive to said fault control signal for repeatedly energizing said audible signal generator, said second train of signal pulses having a pulse rate and duration such that said audible signal generator produces an intermittent audible warning signal.

6. The invention as defined in claim 5 including:

an audio signal drive circuit coupled with said audible signal generator, and means for disenabling said audio signal driver circuit for intermittently interrupting said second train of signal pulses.

7. The invention as defined in claim 1 wherein said control circuit is implemented in an application specific integrated circuit.

8. The invention as defined in claim 1 wherein said control circuit is implemented in a microprocessor.

9. In a door operator of the type comprising a power actuator for opening and closing a door, a control circuit for energization or deenergization of the power actuator, said control circuit being disposed in a housing and supported on a circuit board, a beam break system having a beam transmitter for emitting a beam of radiant energy across the doorway of said door and a receiver for receiving said beam, said receiver including a detector coupled with said control circuit for deenergizing said power actuator in response to an obstruction or misalignment of said beam, the improvement comprising:

an annunicator including an audible signal generator, said audible signal generator comprising a piezoelectric crystal mounted on said circuit board in said housing, said housing including a cover plate, and said piezoelectric crystal being acoustically coupled with said cover plate for amplification of the sound generated by said crystal.

10. The invention as defined in claim 9 wherein:

said piezoelectric crystal is mounted by a layer of foam plastic between one face of said crystal and the printed circuit board and by a layer of foam plastic between the other face of said crystal and said cover plate, said cover plate being secured with said housing in a position to compress the foam pads whereby the acoustic coupling is enhanced.

11. A method of aligning the beam transmitter and beam receiver in a door operator which comprises a power actuator for opening and closing a door, a control circuit for controlling energization and deenergization of the power actuator, a beam break system having a beam transmitter including a beam emitter for transmitting a beam of radiant energy across the doorway of said door and a beam receiver including a beam detector for receiving said beam, said control circuit including a detector circuit having an input coupled with said beam detector and including means for producing a normal control signal when the transmitter beam is received by the beam detector and producing a fault control signal when the transmitter beam is not received by the beam detector, and means responsive to said normal control signal for enabling energization of said power actuator and responsive to said fault control signal for disenabling energization of said power actuator, and an annunciator circuit coupled with said detector circuit and responsive to said fault control signal for producing an warning signal, said method including the steps of:

activating the beam transmitter for transmitting a beam, activating the beam receiver for receiving a beam, if there is a warning signal, adjusting the alignment of the transmitter and the receiver so that there is no warning signal, and fastening the position of said transmitter and receiver in the alignment in which there is no warning signal.

* * * * *